F. B. WALTON.
Lubricating Device.

No. 199,602. Patented Jan. 22, 1878.

UNITED STATES PATENT OFFICE.

FRANKLIN B. WALTON, OF DALLAS, TEXAS.

IMPROVEMENT IN LUBRICATING DEVICES.

Specification forming part of Letters Patent No. 199,602, dated January 22, 1878; application filed December 21, 1877.

*To all whom it may concern:*

Be it known that I, FRANKLIN B. WALTON, of the city and county of Dallas, and State of Texas, have invented a new and improved device for lubricating the ways or cross-heads of steam-engines or other machinery; and I do hereby declare that the following is a full, clear, and exact description of the same.

The object of the invention is to provide improved means for lubricating the guides or slides of engines and similar parts of other machinery.

The invention consists in providing a reservoir or cup for the lubricant, either in the cross-head of the engine or the guides between which it works, and in applying a rotating wheel in such a manner that a portion of its periphery is immersed in the lubricant, while another portion is in contact with the cross-head, so that as the latter reciprocates the wheel will be caused to rotate, and thus take up and apply the lubricant to the opposing friction-surface of the cross-head or guide, as the case may be. The top of the reservoir is a metallic plate having a slot, through which a segment of the said wheel projects, and in which it closely fits, so that it acts as a valve, preventing dust or other foreign matter entering the reservoir.

Figure 1:
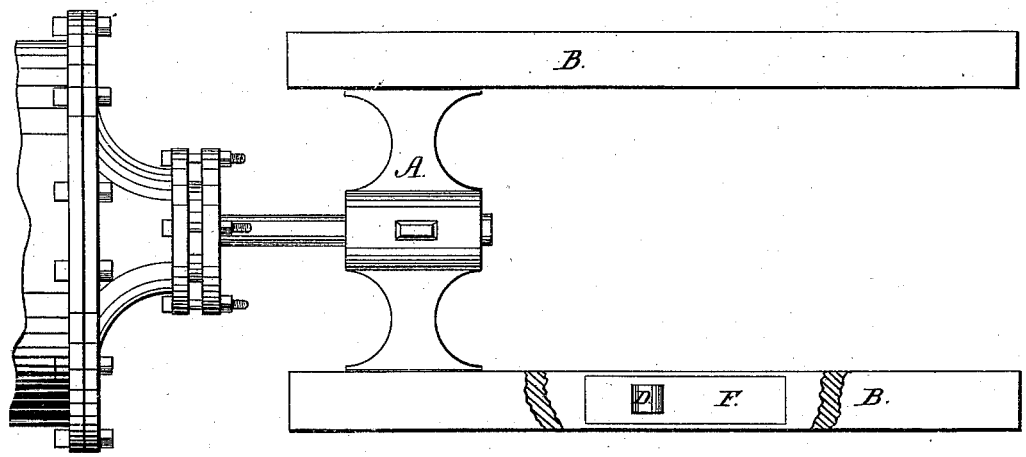
Figure 2:
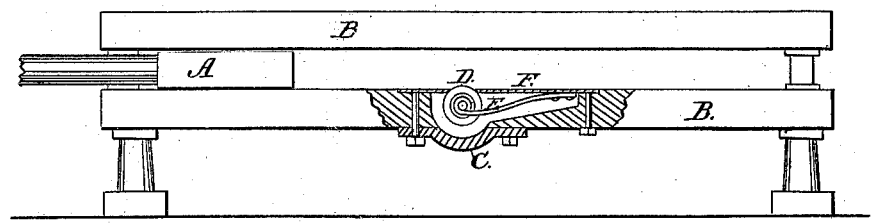

In the accompanying drawings, forming part of this specification, Figure 1 is a plan view of the guides and cross-head of an engine; and Fig. 2, a side view of one of the guides, with part broken out to show the arrangement of the lubricating-wheel.

A indicates the cross-head, and B B the parallel guides. The cup or reservoir for the lubricant is formed by slotting the guide vertically, and applying a recessed plate, C, to the under side thereof. The wheel D is journaled in the forked end of a flat spring, E, which is attached to the under side of the slotted plate F, that covers the oil-cavity. A small segment of the wheel projects through the slot in said plate F, and the wheel is held against the cross-head by the elastic force of the spring E, thus serving as a means for taking up and applying the lubricant at each reciprocation of the cross-head.

The wheel fits closely in the slot, and being pressed upward by the spring E, it acts as a valve, excluding dust and other foreign matter from the reservoir, which is an important function, and especially valuable and necessary when the device is employed on thrashing and planing machines, &c.

In locomotives in which double guides are employed, and in which the cross-heads are at times subjected to an upward thrust, the lubricating device may be applied to the upper side of the cross-head instead of the guide, so that the wheel will work in contact with the under side of the upper guide.

In either of the two modes of applying the devices, when the cross-head is reciprocated the wheel D is rotated, and thereby caused to take up and apply the lubricant to the friction-surface with which it works in contact. Any excess of oil taken up by the wheel is removed or scraped off by the slot-edge of the plate F.

I thus provide a lubricating device which is simple and durable in construction, not liable to get out of order, and automatic in its operation.

What I claim is—

1. The combination, with the cross-head of an engine or other reciprocating part of machinery, and the guides or ways on which it works, of a reservoir for the lubricant, a wheel for taking up and applying the same to the friction-surface with which the wheel works in contact, and a spring for supporting the wheel, substantially as shown and described.

2. The slotted metallic plate, the wheel, a segment of which fits the slot therein, and the spring in which the wheel is journaled, all combined as shown and described.

FRANKLIN B. WALTON.

Witnesses:
DANIEL M. FULENWIDER,
JAMES I. REEKES.